United States Patent
Berbalk

[11] 3,793,687
[45] Feb. 26, 1974

[54] METHOD FOR MACHINING THE STROKE BEARINGS AND LINE BEARINGS OF A CRANK SHAFT

[75] Inventor: Hermann Berbalk, Goppingen, Germany

[73] Assignee: Gebruder Boehringer Gesellschaft mit beschrankter Haftung, Goppingen, Germany

[22] Filed: Feb. 20, 1973

[21] Appl. No.: 333,513

[30] Foreign Application Priority Data
Feb. 23, 1972 Germany.............................. 2208593

[52] U.S. Cl.............................. 29/6, 29/558, 82/9, 90/11 C, 51/73 GC, 51/327
[51] Int. Cl............................................... B23c 3/06
[58] Field of Search... 29/6, 558; 82/9, 10; 90/11 C; 51/73 GC, 90, 98 SP, 327

[56] References Cited
UNITED STATES PATENTS
2,174,083   9/1939   Groene ...................................... 82/9

Primary Examiner—Francis S. Husar
Attorney, Agent, or Firm—Shlesinger, Fitzsimmons & Shlesinger

[57] ABSTRACT

Pairs of bearing sections of a crankshaft, each pair comprising a line bearing and an adjacent stroke bearing are machined consecutively starting with a pair close to one end of the crankshaft and proceeding pair by pair towards the other end of the crankshaft. In this operation the section of the crankshaft located between the pair in cutting engagement with the tools and the other end of the crankshaft is left radially upsupported and freely to undergo any deformation that may result from the removal of stock by the tools, whereas the other section of the crankshaft including the pair of bearings machined in the preceding operation is held by engagement with suitable clamping means. As a result of this method any deformation of the character just explained is eliminated by the subsequent machining operation and the end product is free from any deformation. Therefore, it is no longer necessary, as heretofore, to subject the crankshaft after the roughing operation to a truing and finishing operation prior to the heat treatment and the grinding operation.

2 Claims, 2 Drawing Figures

METHOD FOR MACHINING THE STROKE BEARINGS AND LINE BEARINGS OF A CRANK SHAFT

My invention relates to a method for matching the stroke bearings and line bearings of a crankshaft.

BACKGROUND AND OBJECTS

Crank shafts have two kinds of surfaces of revolution, a first kind disposed co-axially to the central axis, such as the stub end portions and the line bearings of the crank shaft, and a second kind disposed eccentrically to the central axis of the crank shaft, such as the stroke bearings. For machining these surfaces of revolution of a blank produced by a forging or casting process it is common practice to proceed by performing consecutively the following steps:

1. In a first operation the blank is cut transversely near its ends to give it its proper length and the end faces so formed are provided with centered recesses for the engagement by the center pins of the machine tool;

2. the first kind of surfaces co-axially located with respect to the axis of the crank shaft are roughed and 3. the stroke bearings are roughed.

This conventional method has the disadvantage that, when stock is removed from the bearing surfaces, particularly the stroke bearings, internal stresses of the material are liberated resulting in a radial deformation of the crank shaft. Such deformation dislocates the previously machined surfaces of revolution of the first kind so that they will no longer accurately register with each other and with the straight axis of the crank shaft. Therefore, the crank shaft must be subjected to a truing operation subsequently to the roughing operation. In this truing operation the crankshaft is subjected to bending stresses. It is extremely difficult and seomtimes impossible to obtain the required accuracy of the shape of the crank shaft by such truing operation. Therefore, it is necessary subsequently to the truing operation to finish the line bearings, and, under certain circumstances, the stroke bearings by a grinding operation in a grinding machine or by a finish cutting operation in a lathe. Thereafter, the crank shaft may be heat-treated whereupon the crank shaft is fine-finished by a grinding operation.

It is the object of the present invention to so machine the stroke bearings and the line bearings of the crank shaft that the crank shaft upon termination of this operation is no longer deformed or distorted and therefore, need not be trued.

It is a further object of my invention to so machine the crank shaft in a lathe by means of cutting tools that the deformation caused by the removal of stock in the cutting operation is restricted to a non-machined section of the crank shaft and will be eliminated by the subsequent machining of this section.

It is old in the art (U.S. Pat. No. 3,590,469) to attain these objects by machining the line bearings and the stroke bearings of the crank shaft individually one after the other starting with the line bearing adjacent to one end of the crank shaft and proceeding bearing by bearing towards the other end of the crank shaft. This method, however, is relatively time-consuming since only a single bearing section of the crank shaft is machined at any given time. If, for example, the crankshaft is one having four crank bearings and five line bearings, then nine machining operations must be performed in succession.

It is a primary object of the present invention to greatly reduce this time. I attain this object by machining pairs of bearing sections consecutively one pair after the other, each pair comprising a line bearing and an adjacent stroke bearing, machining the bearings of each pair simultaneously. This results in a considerable reduction in the over-all time required for carrying out the method. It has proved that distortions of the crankshaft can be very largely, if not completely, avoided in this way. At all events a crankshaft which has been rough-finished in this way is so accurate in shape that it can be ground in the usual way without having to be trued-up beforehand. Therefore, the present invention retains the advantages of the method of U.S. Pat. No. 3,590,469 to an extent which is adequate in practice whilst the overall time required for machining the crankshaft is considerably reduced.

DETAILED DESCRIPTION

A preferred embodiment of the novel method will now be described in detail with reference to the drawings. It is to be understood, however, that such detailed description serves the purpose of illustrating the invention rather than that of restricting or limiting the same. The embodiment of the invention described hereinafter is capable of numerous modifications within the scope of the appended claims.

In the drawings

Figure 1:
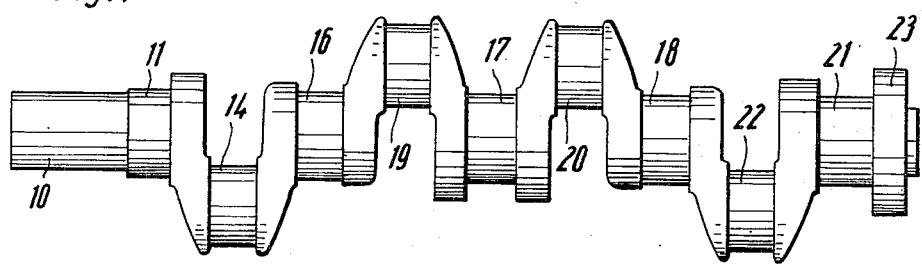
FIG. 1 shows a crank shaft rough-finished by using the method according to the invention.
Figure 2:
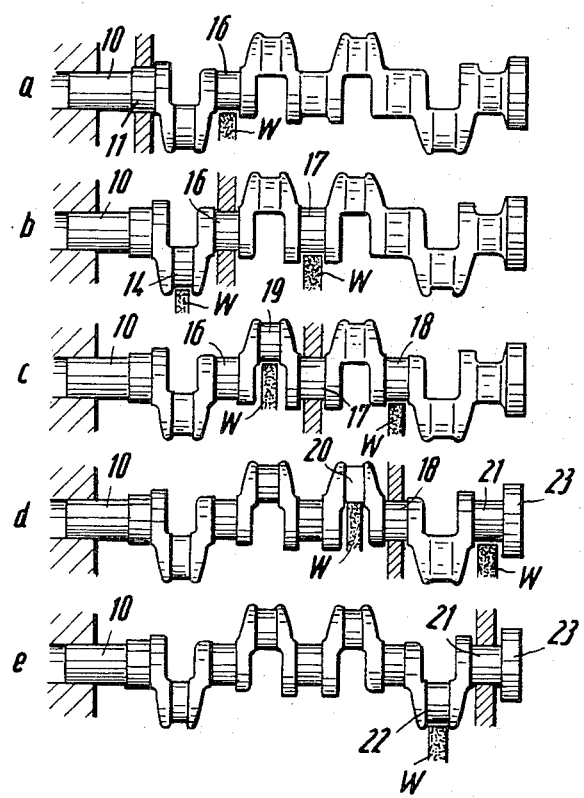
FIG. 2 shows the successive steps in machining the crank shaft blank.

A crankshaft with five main bearings and four crank pins, as used in a large number of motor vehicles, is shown as an example in FIG. 1. After cutting to length and centring, the end-bearings 10 and the first main bearing 11 are machined. As in the method according to U.S. Pat. No. 3,590,469, the machined surface of the end-bearing 10 is used as reference surface for all subsequent machining operations and the machined surface of the first main bearing 11 is used as reference surface for the next machining operation.

For the first machining operation a the crankshaft is clamped at the left end-bearing 10 and the first line-bearing 11. The second line bearing 16 is then machined by a tool W. Because of its short distance from the first line bearing, the second line bearing is correctly positioned with a high degree of accuracy. If stresses in the material are released by this operation, this only results in the section of the crankshaft at the right of the second line bearing becoming misaligned.

For the next machining operation b, the crankshaft is clamped at the end-bearing 10 and the line bearing 16. A pair of bearings are then machined, which consist of the first crank-pin bearing 14 and the third line bearing 17. In this case the bearings being machined are again accurately positioned because of their proximity to the clamped line bearing 16.

In the third machining operation c, the work-piece is clamped at the end-bearing and the line-bearing 17. Once again a pair of bearings are machined. This pair consists of the fourth line bearing 18 and the second crank-bearing 19.

In the fourth machining operation d, the crankshaft is clamped at the end-bearing 10 and the fourth line-bearing 18. In this case a pair of bearings is machined which consists of the third crank-bearing 20 and the fifth line-bearing 21.

There now remains only the right-hand crank-bearing 22 to be machined. This takes place in machining operation e, in which the crankshaft is clamped at the right end-bearing and the fifth line-bearing 21.

If the shaft is clamped at a flange 23 to prevent oscillation of the crankshaft during machining, this clamping must be released after each of the machining operations a and d so that deformations of the shaft caused by the removal of the material at the bearing emplacements can even out. To this end, the flange 23 must be clamped by jaws which engage on the faces of the flange extending at right angles to the axis of the crankshaft without exerting a force on the flange 23 in the radial direction. As far as the tools W are concerned, these may, for example, be annular milling cutters which describe a planetary motion and carry milling teeth on the inside. During machining the axis of rotation of this tool orbits around the axis of surface to be machined. As it does so, the cutting edges of the teeth describe curves which envelop the machined surface.

If two such rotary tools are used, these may be arranged on a longitudinally movable saddle and may be positioned, by the latter, successively opposite the surface on the crankshaft to be machined.

What I claim is:

1. A method for machining the crank-bearings and line-bearings of a crankshaft comprising the steps of machining pairs of said bearings in successive machining operations, each pair comprising a crank-bearing and an adjacent line-bearing, the bearings constituting each pair being machined simultaneously, commencing said successive machining operation with such one of said pairs that is close to one end of the crank-shaft and proceeding pair by pair towards the other end of the crankshaft and holding the crankshaft during each succeeding machining operation by engagement with clamping means of such bearing surface as has been machined in the preceding machining operation, whereas the bearing surfaces of the pairs to be machined subsequently and said other end of the crankshaft are left unengaged by clamping or centering means and free to undergo radial displacement.

2. A method as claimed in claim 1 in which the first line-bearing and the last crank-bearing do not form part of one of said pairs and are machined individually.

* * * * *